March 21, 1950 J. G. OGDEN 2,501,648
CLUTCH
Filed Feb. 15, 1945 2 Sheets-Sheet 1

INVENTOR
John G. Ogden
BY
Busser Harding
ATTORNEYS.

WITNESS:
Robt R Mitchel

March 21, 1950 J. G. OGDEN 2,501,648
CLUTCH
Filed Feb. 15, 1945 2 Sheets-Sheet 2

INVENTOR
John G. Ogden
BY
Busser & Harding
ATTORNEYS.

WITNESS:

Patented Mar. 21, 1950

2,501,648

UNITED STATES PATENT OFFICE 2,501,648

CLUTCH

John G. Ogden, Philadelphia, Pa., assignor to Guy G. Ogden

Application February 15, 1945, Serial No. 578,079

1 Claim. (Cl. 64—29)

This invention relates to a clutch and in particular to a clutch of slipping type adapted to be incorporated in a driving train of mechanism.

The automatic prevention of overload in a driving mechanism is frequently of great importance. As an example may be cited the case of electric motor drives in which very frequently it is necessary to use motors of types capable of delivery of power greatly in excess of normal requirements. For example, assume a type of load on an electric motor which normally requires one horsepower but is liable to require at infrequent intervals one and a half horsepower due to the possibility of infrequent but probable temporary overloads. If a one-horsepower motor is provided in such a case damage to the motor may be avoided by the provision of the usual type of overload circuit breaker but the operation of this circuit breaker will ordinarily result in the shutting down of the motor when the overload occurs. Accordingly, if such shut-down is to be avoided it is necessary to supply an oversize motor which, through the greater part of its operating time, will be called upon to supply only a fraction of its rated power. It may also be necessary to supply an oversize motor in such cases merely to insure that the safety controls will not open the motor circuit in the case of starting under load.

To avoid these difficulties various proposals have heretofore been made to incorporate in the train of mechanism between a prime mover and its load a clutching device capable of slipping upon the occurrence of overloads so as to limit the load on the prime mover. Hydraulic clutches for such purposes are quite satisfactory and have been commonly used in ship propulsion and more recently for automotive purposes but they are necessarily very bulky and are not adapted to be incorporated as integral parts of motors or in other apparatus where cost must be kept low. Friction clutches are generally unsatisfactory because any continuous overload will result in destructive heating. Proposals have also been made involving location of tapered pins, balls or other elements in sockets in such fashion that when a predetermined overload occurs they will, by cam action, be forced out of their sockets to permit slippage. Such devices are also very unsatisfactory particularly for high speed operation since when slippage occurs they are extremely noisy and involve destructive impacts of the parts.

The present invention relates to a slipping clutch arrangement capable of limiting the load on a prime mover but adapted to operate quietly and without friction at very high speeds such as the ordinary speeds of a motor shaft. In brief, the present invention relates to the provision of engaging elements, the driving forces between which do not depend upon friction and which are arranged for smooth relative movement, with the contacting surfaces well lubricated and without possibility of detrimental impact. The clutch of the present invention involves a smooth transition between the conditions of non-slipping drive and complete slippage such as may occur when the driven element is stationary while the driving element operates at substantially full speed.

The general objects of the present invention indicated above together with other objects related particularly to details of construction and operation will become apparent from the following description read in conjunction with the accompanying drawings in which.

Figure 1:
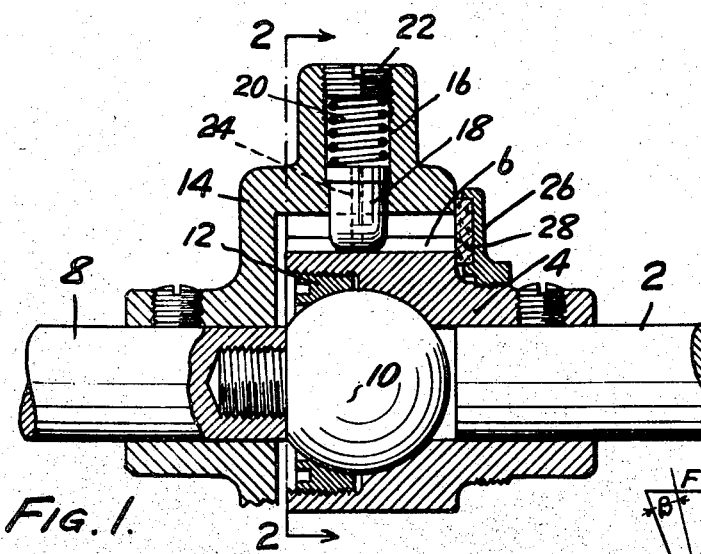
Figure 1 is a partial sectional view of one form of clutch provided in accordance with the present invention.
Figures 2, 3:
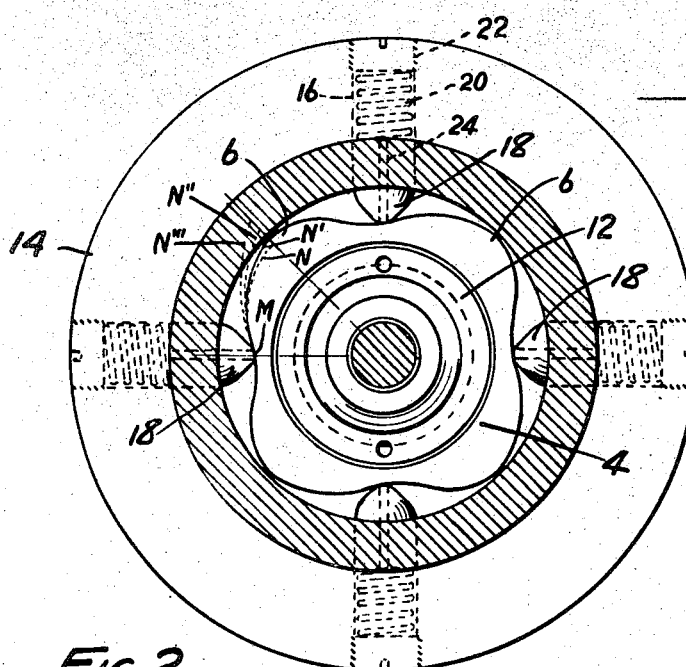
Figure 2 is a section of the same taken on the plane the trace of which is indicated at 2—2 in Figure 1.
Figure 3 is a force diagram illustrating the principles of operation involved.

Referring first to the modification shown in Figures 1 and 2, a shaft 2 carries a clutch member 4 which is provided with lobes 6 of the form indicated. A second co-axial shaft 8 is provided with a ball 10 at its end engaging a spherical socket provided in part by a surface of the member 4 and in part by a retaining ring 12. A second clutch member 14 secured to the shaft 8 has a series of radial openings 16 receiving plungers 18 which are arranged to bear upon the outer surface of the clutch member 4 under the action of strong springs 20, the compression of which may be adjusted by screws 22 threaded in the outer portions of the openings 16. The plungers 18 are desirably provided with small bores indicated at 24 which serve to lead lubricant, such as a suitable grease, to the engaging surface between the plungers 18 and the lobes 6 if the openings 16 are packed therewith. A type of pumping action occurs when slipping takes place whereby sufficient grease will be forced to the engaging surfaces to effect proper lubrication thereof. In order to retain the lubricant within the clutch a suitable soft packing, such as felt or the like, indicated at 28 may be held in bridging relationship between the clutch members by a ring 26 threaded on the member 4.

The sphere and socket arrangement illustrated is provided solely for the purpose of illustrating the fashion in which provision may be made for slight angular misalignments of the shafts 2 and 8. As will be evident from the construction of the clutch, the engaging elements will function despite slight misalignment. It is not necessary to provide such accurate aligning means as provided by the ball and socket illustrated. Instead it may be frequently sufficient to provide no special means beyond the clutch elements themselves for maintaining approximately axial alignment of the shafts.

Either the shaft 2 or the shaft 8 may be the driving shaft connected to the source of motive power. For simplicity and consistency of description, however, it will be assumed that the shaft 8 is the driving shaft and tends to rotate the shaft 2 clockwise as viewed in Figure 2. So long as the torque to be transmitted and represented by the resistance torque of the driven shaft is small, the plungers 18, which are provided with rounded noses of small radius of curvature, but preferably somewhat elongated as illustrated in an axial direction, will be located in the troughs between the lobes 6 in engagement with the beginnings of the rises of the lobes in a clockwise direction and will transmit the required torque to the driven shaft. As will be noted hereafter this driving force does not depend upon friction and, in fact, it is desirable that the contact should be as well lubricated as possible to avoid any substantial heating when slippage occurs.

If the resisting torque of the driven shaft is too high so that motion cannot be imparted thereto by the shaft 8, under which conditions it may be assumed that the shaft 2 may be stationary, the plungers 18 will ride over the lobes in smooth fashion under well lubricated conditions so that little frictional heating will occur and silent operation will take place even at a high speed of shaft 8 due to the fact that the rises and falls of the lobes 6 are gradual and smoothly cam the plungers 18 outwardly and are followed smoothly by them in their inward movements under the actions of the springs 20. For example, a four lobed arrangement of the type illustrated is capable of operating quite smoothly at ordinary motor speeds. The number of lobes, however, is not of importance and, in fact, the clutch member 4 may, under some conditions, have its outer surface formed merely as a single lobed eccentric cam though it is desirable to provide a symmetrical arrangement of lobes to secure balanced forces. More than four lobes may be provided if desired and in particular for lower speeds of operation which, as will be evident hereafter, will reduce correspondingly the heights of the lobes.

Figure 3 represents in the form of a force diagram the conditions existing at a point P on the rise of a lobe when equilibrium exists, which conditions establish the design characteristics of the rise. The slope of the lobe surface at P is indicated by the tangent line PT. Assuming a point contact of the plunger at P (approximated by a contact nose of small radius of curvature), let the radial vector S represent the radial force exerted by the plunger, assuming the plunger to be radially movable. Let $\alpha$ be the angle which tangent PT makes with a normal to the radius, and let $\beta$ be the angle of repose of the plunger with respect to the material of the lobe under the conditions of lubrication existing at the point of contact, this angle being small if the coefficient of friction is small. The force $f$ exerted by the driving plunger on the lobe then has, as shown, the radial component S and the tangential component F.

The torque applied by the force F at the point P is then Fr. Of interest, then, is the determination of the cam shape to make this torque equal to a constant L throughout the entire rise of the cam or lobe surface.

The spring force S will be equal to $s(r-r_0)$ in which $s$ is the spring constant and $r-r_0$ represents the strain of the spring from its fully expanded condition.

From the diagram:

$$F = S \cdot \tan(\alpha + \beta)$$

Therefore:

$$Fr = L = rs(r-r_0) \cdot \tan(\alpha + \beta)$$

Now, $$\tan \alpha = \frac{dr}{r \cdot d\theta}$$

so that:

$$rs(r-r_0) \left\{ \frac{\frac{dr}{r \cdot d\theta} + \tan \beta}{1 - \frac{dr}{r \cdot d\theta} \cdot \tan \beta} \right\} = L$$

whence:

$$\theta = \int \frac{rs(r-r_0) + L \cdot \tan \beta}{rL - r^2 s(r-r_0) \cdot \tan \beta} \cdot dr + C$$

in which C is to be evaluated so that when $\theta = 0$, $r$ has some initial value R.

This may be integrated (most readily by a planimeter which will give sufficient accuracy in view of the inherent inaccuracy involved in evaluation of the value of the coefficient of friction) to give a relation between $\theta$ and $r$ which will represent in polar coordinates the theoretically required curve for the rise of the lobe.

Assuming that the curve thus given is followed by the lobe rise MN, this means that for any point of contact of the plunger along this rise the torque transmitted will be L. If the resistance offered by the driven shaft is less than L, the plunger would remain in the trough at M; if the resistance torque is greater than L, however, the plunger would move all the way up the rise and drop over the hump at N. Thus this rise would represent a critical design involving the clutch's driving up to a torque L but slipping as soon as L was exceeded.

Desirably, therefore, the rise to be provided is somewhat "steeper" than MN, as for example MN'. Then, for some range of torque exceeding L, if MN' is tangent to MN at M, the plunger will occupy different positions on the rise of the lobe for different values of torque. In other words, relative movement of the driving and driven members will start when torque L is reached and finally when some particular greater value of torque is involved slippage will occur over the hump. Greater ranges of torque between the beginning of relative movement and final slippage will be secured by designs of the rise such as MN″ and MN‴. Generally speaking, a rise less than MN will not be desirable, if it starts tangent to MN, since this would mean that only the beginning of the rise would ever be operative for driving whereas, to reduce wear and secure better stability of operation, it is desirable to make use of as much as possible of the rise for driving through the torque range between first relative movement and continuous slippage.

The foregoing does not mean, however, that other rises lying inside MN are not usable provided they start with less slope than MN. In such case they merely represent drive with lower torque values.

As will be apparent from the above, the rises of the lobes are alone of substantial importance from the standpoint of design and the falls of these lobes need only be chosen so as to smoothly merge with the ends of the preceding rises and the beginnings of the succeeding ones with smooth transition between them so that the springs will cause the plungers 18 to move continuously in contact with the entire lobe surface to avoid sudden drops which would create impact and noise. In fact, if noise is not objectionable even this criterion may be departed from and the plungers may be permitted to drop suddenly from the peak of one lobe to a radius corresponding to the beginning of the rise of the next.

As will now be clear, drive between the driving and driven elements involves a smooth transition between the condition of drive without any relative movement of the parts and the condition which would exist if the driven shaft were stationary. The transition will involve merely a readjustment of the relative relationships of the driving and driven parts.

The operation of the clutch under various conditions may be described by way of example as follows:

Suppose, for example, that the drive shaft 2, when stationary, is under substantial load and the shaft 8 is connected to a driving motor which is started. The driving motor may come up to full speed quite rapidly and will be opposed by no more than the maximum torque capable of transmission through the clutch. Under such conditions a very large degree of slippage may occur but whenever the plungers 18 are rising over the lobes a torque will be exerted on the shaft 2 which, if the shaft 2 is not completely stalled, will tend to pick up the shaft gradually so that its speed will increase gradually though the shaft 8 may be operating at substantially full speed. Thus a load may be picked up by the motor without imposing upon the motor itself an overload which would actuate an overload relay to stop it. If, when the speed of the shaft 2 is brought up to a normal amount, the resisting torque imposed by it is less than the torque capable to transmission, operation will occur without any slippage. If, however, due to some circumstances, the shaft 2 imposes on the clutch a torque in excess of that which it is capable of transmitting, smooth slippage occurs with a continuous application to the shaft 2, however, of a torque equal to that which the clutch is capable of transmitting. The resulting operation may involve a slowing down of the shaft 2 and a consequent reduction of the resisting torque but drive will nevertheless continue without overloading the motor.

It will be evident that the applicability of the invention is very wide in view of the foregoing characteristics of operation. It is particularly adapted to those situations which may involve high starting loads or abnormal obstructions of the driven mechanism such as may occur in processing, road building machinery, hoists or the like. The motor need only be rated for the torque which the clutch is capable of transmitting. By adjustment of the compression of the springs a substantial range of the maximum transmitted torque may be secured, while, if the operating characteristics are to be very substantially changed, substitution of other clutch members may be provided.

Figure 4:
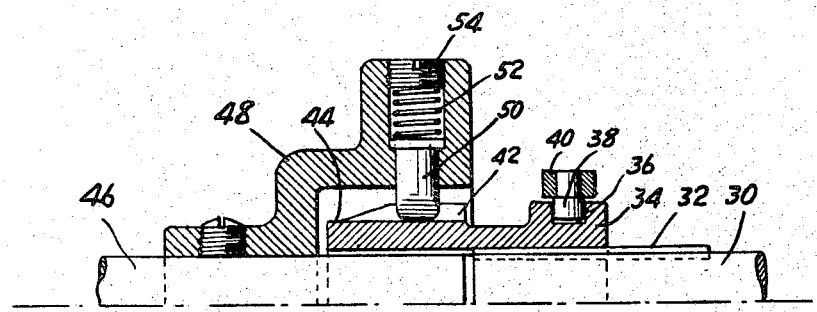
Figure 4 is a sectional view similar to Figure 1 but showing a modified form of clutch arrangement for controlled disengagement.

Figure 4 represents the application of the foregoing principles to a clutch which may be manually entirely disengaged. In this adaptation of the invention a shaft 30 has splined thereto, as indicated at 32, a clutch member 34 axially movable by engagement within an annular groove 36 of a pin or roller 38 carried by a clutch shifting lever 40. Lobes 42, similar to the lobes 6 previously described, are in this case carried by the outer surface of the clutch member 34 but are merged at their left ends with a cylindrical surface 44. The other shaft 46 carries the second clutch member 48 which supports plungers 50, similar to the plungers 18, arranged to be urged inwardly by springs 52 backed up by adjustable screws 54. With the clutch member 34 in the position illustrated drive takes place in the fashion described above. If, however, the member 34 is moved to the right either the cylindrical portion 44 is brought under the plungers or moved further to the right to clear these plungers until the clutch connection is entirely broken. If the lobes are caused to merge smoothly with the cylindrical portion 44 with reduction of their amplitudes, it will be evident that a gradual picking up of the transmitted load may be attained by slowly moving the clutch member from its disengaged to its engaged position.

Figure 5:
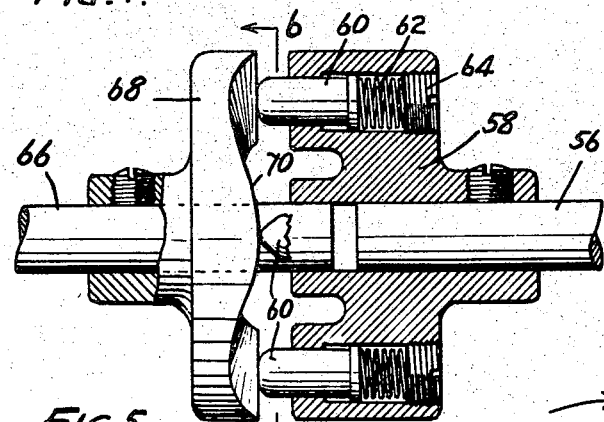
Figure 5 is a similar section of still another modification showing an alternative disposal of the driving elements.
Figure 6:
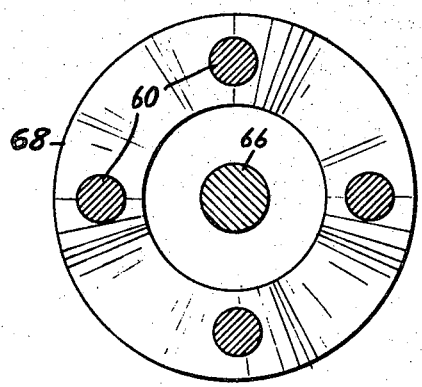
Figure 6 is a section through the modification of Figure 5 taken on the plane the trace of which is indicated at 6—6.

Figures 5 and 6 illustrate a further modification of the invention which may be utilized where a somewhat more compact arrangement is required from the standpoint of radial space. In this arrangement a shaft 56 carries a clutch member 58 which supports axially movable plungers 60 backed up by springs 62 and adjustable screws 64. The other shaft 66 carries a clutch member 68 which is provided with lobes 70 having amplitudes varying in an axial direction as illustrated. It will be evident that all of the considerations above set forth are applicable to this arrangement as well as to that of Figure 1, with respect to design of the rises of the lobes and other matters. In fact, as a further extension of the principles of the invention, it will be evident that lobes may face inwardly on one of the clutch members and the cooperating plungers may be urged outwardly against them.

Figure 7:
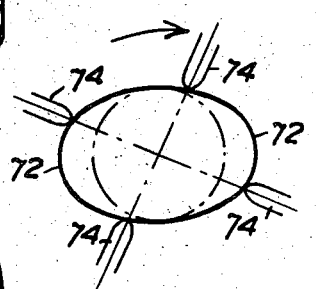
Figure 7 is a diagram illustrating a further modification of the invention.

Figure 7 illustrates the fashion in which the invention may be embodied in a clutch having a cam of two lobes which will maintain the system balanced and may be desirable for extremely high speed operation to minimize the reciprocations of the plungers when the driven element is stationary or operating at a speed substantially less than that of the driving element. The cam in this case is illustrated at 72 and is arranged to cooperate with plungers 74. There may be only two plungers but this modification illustrates the use of four plungers in conjunction with the double lobed cam. In such case it will be evident that two of the plungers are operating in a different phase from the other two, i. e., two of them may be on the rises of the lobes while the other two may be on the falls of the lobes in which case the latter will be essentially inactive. By the use of this arrangement a more continuous application or torque occurs during slippage in that substantially at all times there will be transmission of torque whereas in the case of the previous modification the application of torque is intermittent during a single relative rotation of the driving and driven shafts.

It will be evident that numerous variations in details of the embodiment of the invention may be made without departing from the scope thereof as defined in the following claim.

What I claim and desire to protect by Letters Patent is:

A clutch for limiting the torque transmitted from a driving element to a driven element comprising a cam member arranged for connection with one element and a cooperating member arranged for connection to the other element, said cooperating member having a plurality of opposed spring actuated cam followers arranged to bear directly on said cam member and said cam presenting to said followers a smoothly continuous entirely convex surface symmetrical about the axis of rotation so that, when slippage takes place upon occurrence of a resisting torque exceeding the limiting value, relative sliding of the followers and cam will occur without impact.

JOHN G. OGDEN.

REFERENCES CITED

The following references are of record in the file of this patent:

UNITED STATES PATENTS

| Number | Name | Date |
| --- | --- | --- |
| 461,813 | Cahow | Oct. 27, 1891 |
| 508,426 | Klipstein | Nov. 14, 1893 |
| 1,498,171 | Kaps | June 17, 1924 |
| 1,518,634 | Cason, Jr. | Dec. 9, 1924 |
| 2,116,192 | Draminsky | May 3, 1938 |
| 2,119,413 | Batchelder | May 31, 1938 |
| 2,135,929 | Wood | Nov. 8, 1938 |
| 2,325,780 | Langford | Aug. 3, 1943 |

FOREIGN PATENTS

| Number | Country | Date |
| --- | --- | --- |
| 113,341 | Great Britain | 1918 |
| 693,259 | Germany | 1940 |